United States Patent
Evans et al.

(10) Patent No.: US 7,446,883 B2
(45) Date of Patent: Nov. 4, 2008

(54) METHOD AND APPARATUS FOR TILT CORRECTED LATERAL SHEAR IN A LATERAL SHEAR PLUS ROTATIONAL SHEAR ABSOLUTE FLAT TEST

(75) Inventors: Christopher James Evans, Higganum, CT (US); William P. Kuhn, Tuscon, AZ (US)

(73) Assignee: Zygo Corporation, Middlefield, CT (US)

( * ) Notice: Subject to any disclaimer, the term of this patent is extended or adjusted under 35 U.S.C. 154(b) by 82 days.

(21) Appl. No.: 11/453,677

(22) Filed: Jun. 15, 2006

(65) Prior Publication Data

US 2006/0285123 A1 Dec. 21, 2006

Related U.S. Application Data

(60) Provisional application No. 60/691,034, filed on Jun. 16, 2005.

(51) Int. Cl.
*G01B 11/02* (2006.01)
(52) U.S. Cl. .................. 356/514; 356/510; 356/520
(58) Field of Classification Search .............. 356/514, 356/512, 511, 510, 520
See application file for complete search history.

(56) References Cited

U.S. PATENT DOCUMENTS

| | | | |
|---|---|---|---|
| 4,660,978 A * | 4/1987 | Wu | 356/520 |
| 5,220,397 A * | 6/1993 | Huang et al. | 356/140 |
| 5,982,490 A | 11/1999 | Ichikawa et al. | |
| 6,184,994 B1 | 2/2001 | Freishlad | |
| 7,057,741 B1 * | 6/2006 | Mueller et al. | 356/512 |
| 2003/0035116 A1 * | 2/2003 | Inoue | 356/510 |
| 2003/0128367 A1 * | 7/2003 | Sandstrom | 356/508 |

OTHER PUBLICATIONS

Dörband, Bernd and Günther Seitz, "Interferometric testing of optical surfaces at its current limit", Optik 112, No. 9 (2001), pp. 392-398.
Elster, Clemens, "Exact two-dimensional wave-front reconstruction from lateral shearing interferograms with large shears," Appl Opt, V39, No. 29, Oct. 10, 2000, pp. 5353-5359.
Evans, Chris J. and Kestner, Robert N. "Test Optics Error Removal" Applied Optics, 1996, vol. 35, No. 7, 1015-21.
Fritz, Bernard S. "Absolute Calibration of an Optical Flat" Optical Engineering, 1984, vol. 23, No. 4, 379-83.
Küchel, Michael "A new approach to solve the three flat problem" Optik 112, No. 9 (2001) pp. 381-391.
Sonozaki et al "Measurement of profiles along a circle on two flat surfaces by use of a Fizeau interferometer with no standard" Applied Optics, vol. 42, No. 34 (2003) pp. 6853-6858.

* cited by examiner

*Primary Examiner*—Tarifur R Chowdhury
*Assistant Examiner*—Michael LaPage
(74) *Attorney, Agent, or Firm*—Francis J. Caufield

(57) ABSTRACT

A Fizeau or other interferometer is used to provide high resolution, in-situ calibration of an external angle measurement system such as widely spaced high stability plane mirror interferometers (HSPMIs). The calibrated measurement system then measures mechanical tilt during shearing. The tilt data is used to correct the sheared data, preferably before computation of the rotationally invariant (RI) terms. Alternatively, the data may be used to compute the spurious quadratic term and correct after integration.

8 Claims, 4 Drawing Sheets

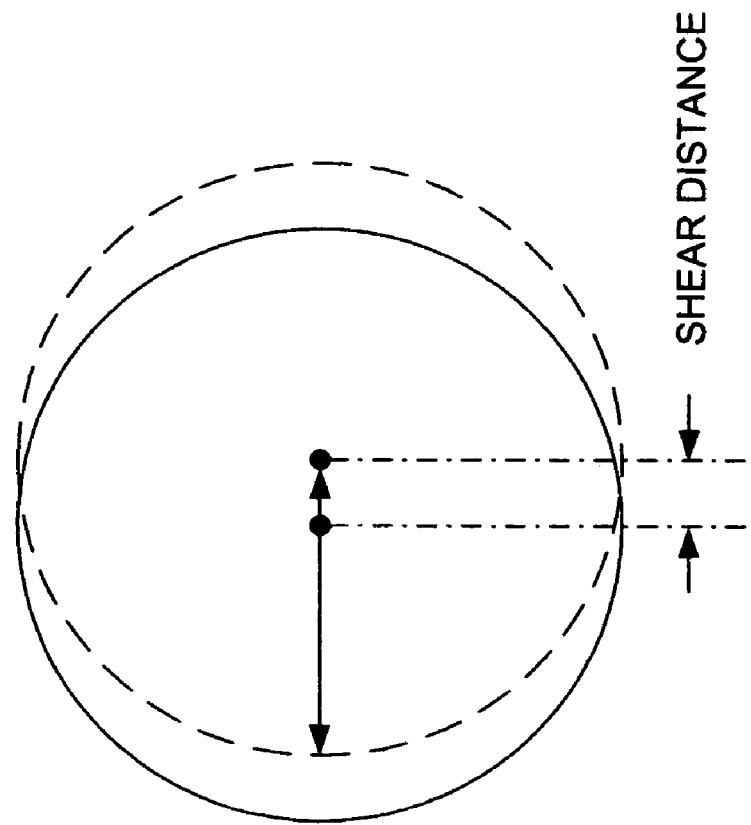
FIG. 3
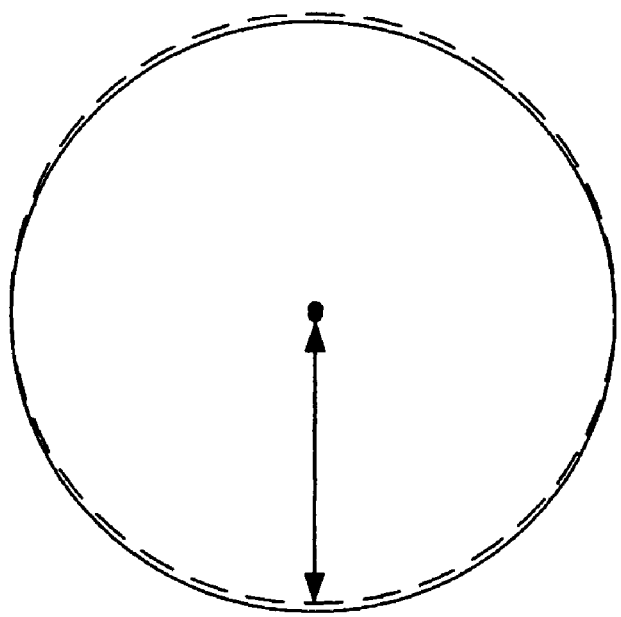

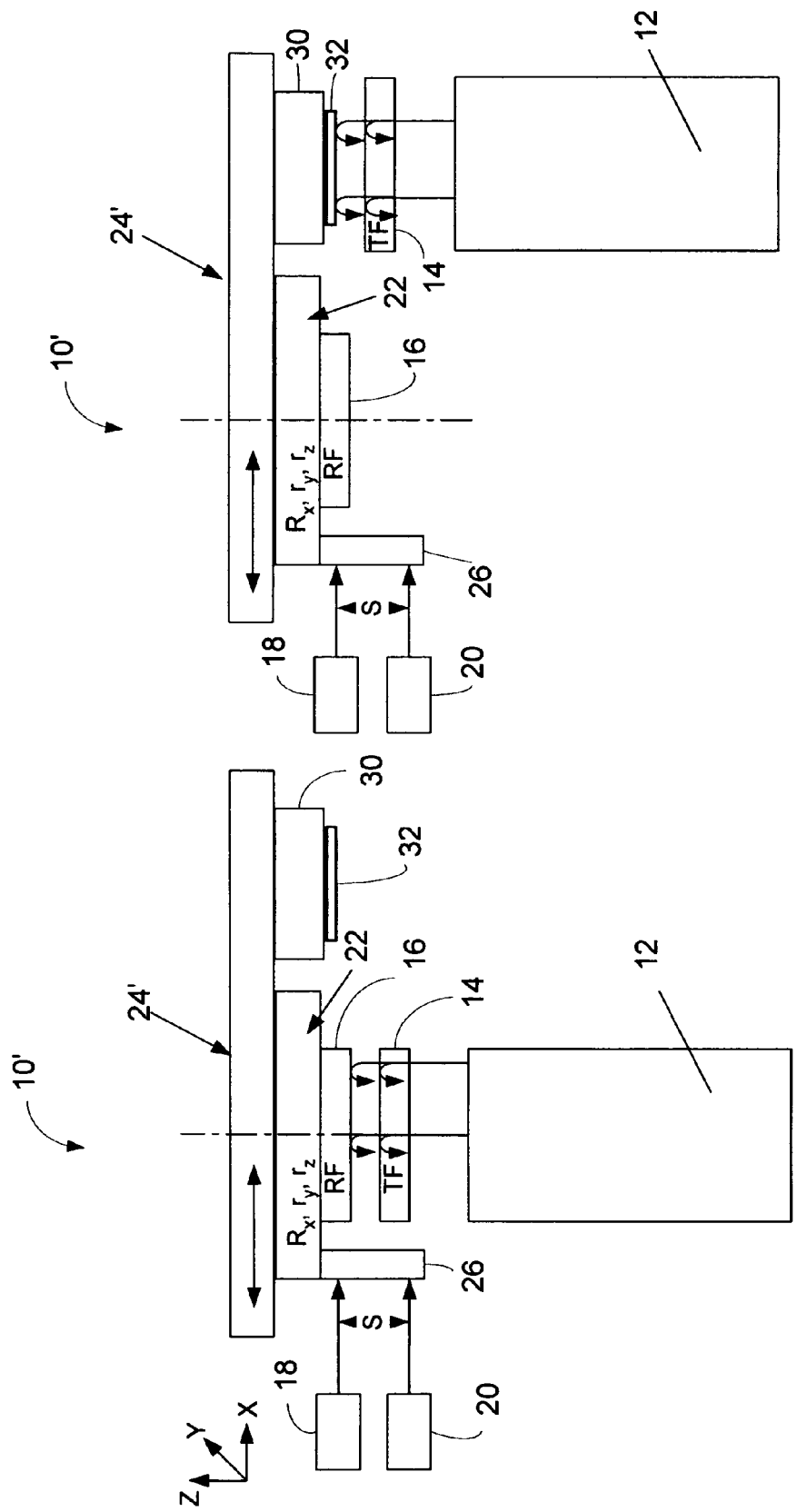

METHOD AND APPARATUS FOR TILT CORRECTED LATERAL SHEAR IN A LATERAL SHEAR PLUS ROTATIONAL SHEAR ABSOLUTE FLAT TEST

CROSS-REFERENCE TO RELATED APPLICATION

This application claims the benefit of priority from U.S. Provisional Patent Application No. 60/691,034 entitled METHOD AND APPARATUS FOR TILT CORRECTED LATERAL SHEAR IN A LATERAL SHEAR PLUS ROTATIONAL SHEAR ABSOLUTE FLAT TEST filed on Jun. 16, 2005 in the name of Christopher James Evans, et al., the entire contents of which are incorporated herein by reference.

BACKGROUND OF THE INVENTION

In optical manufacturing and testing, the phrase "absolute testing" is used to describe procedures designed to separate errors in an instrument or reference surface from errors in a part under test (see for example Evans et al, CIRP Annals, 1996). For flats, most commonly used techniques are derived from the well-known 3-Flat test in which three flats are compared pair wise. Where flats are to be used in systems with the optical axis vertical, it is desirable to measure them in that same orientation. Here, however, the three flat test has the problem that the orientation of one flat with respect to gravity must be changed and, hence, the gravitational deformation changes.

The invention described herein allows high accuracy testing of flats, using just two flats, in any orientation. Because only two flats are required, no change in orientation relative to gravity is required and hence no change in mount induced deformation occurs.

There is substantial literature on the so-called "absolute testing" of optical flats (see, for example, Evans Chris J. and Kestner Robert N. "Test Optics Error Removal" Applied Optics, 1996, Vol 35, No 7, 1015-21). One general approach is to measure multiple objects in different combinations and then to determine the contributions from each object individually such as in the well-known 3-Flat test. The 3-Flat test has a variety of limitations. One of the most significant is the need for three, nominally identical parts to test. Another is that the test generates only two profiles on the part, not information on the entire surface. A third limitation is that the interchanging of flats necessarily inverts the effect of gravity on one of the flats if measurements are made with the optical axes of the flats vertical, a common requirement.

These limitations may be alleviated by the use of lateral shearing (mechanical shift) in two orthogonal directions, proposed by a number of authors—most recently Elster, Clemens, "Exact two-dimensional wave-front reconstruction from lateral shearing interferograms with large shears," Appl Opt, V39, No 29, 10 Oct. 2000, pp 5353-5359. The method is, however, sensitive to drift (.e.g mechanical drift of the part relative to the instrument) and noise.

A number of authors (e.g., Fritz, Bernard S. "Absolute Calibration of an Optical Flat" Optical Engineering, 1984, Vol 23, No 4, 379-83, Evans Chris J. and Kestner Robert N. "Test Optics Error Removal" Applied Optics, 1996, Vol 35, No 7, 1015-21) have described rotational shears, which are robust, but only sensitive to components of the surfaces under test which are rotationally varying (RV) (i.e., vary with azimuthal angle θ in a polar coordinate system) using averaging, Fourier analysis, or other algorithms. Such methods can be combined with a 3-Flat test to generate a full surface map with both RV and rotationally invariant (RI) terms (e.g., Fritz (1984) supra, Evans and Kestner (1996) supra, Bourgeois, Robert P., Joann Magner, and H. Philip Stahl, "Results of the Calibration of Interferometer Transmission Flats for the LIGO Pathfinder Optics", SPIE Vol. 3134, pp 86-94 (1997), and Freishlad, (U.S. Pat. No. 6,184,994)). Such techniques do not, however, solve the problem of measurement of flats where the optical axis is vertical.

Another class of procedures combine a rotational shear and a lateral shear. Ichikawa and Yamamoto (e.g., U.S. Pat. No. 5,982,490) describe apparatus and procedures for absolute calibration using averaging of rotationally sheared data to obtain the RV terms and a lateral shear to obtain the RI term. Dörband, Bernd and Günther Seitz, "Interferometric testing of optical surfaces at its current limit", Optik 112, No. 9 (2001), pp 392-398 describe the application of similar procedures. It is well known that a change in the tilt of the part that is moved during the mechanical translation (shear) causes an error in the quadratic term (in a polynomial expansion, such as Zernike polynomials, which is often referred to as power in the optical community; this error is of little concern in the testing of spherical optics (where the radius of curvature is usually toleranced separately). For flats, however, this is a serious concern.

Note that the change in tilt of the part being moved (tilt error) includes both the angular error motion of the translation mechanism and any drift (e.g. thermally induced) in the mounting of the part that is moved to the translation mechanism.

Evans (1996) supra briefly described an experiment in which the tilt error during translation was measured using an autocollimator and then corrected (limited by the resolution of the autocollimator) before the second (sheared) data set was taken. These experiments were performed with a horizontal optical axis, and the agreement with other methods poor in the quadratic term.

Consequently, it is a primary object of the present invention to provide apparatus and methods by which optical flats may be absolutely measured while compensating for the effects of differences in orientation.

Other objects of the invention will be obvious and appear hereinafter when the following detailed description is read in connection with the appended drawings.

SUMMARY OF THE INVENTION

The invention uses a Fizeau (or other) interferometer to provide high resolution, in-situ calibration of an external angle measurement system, for example, widely spaced high stability plane mirror interferometers (HSPMIs)). The Fizeau interferometer is used to measure the cavity formed between two optic flat surfaces at a number of rotational positions at a first lateral position and at a second lateral position. The data at the various rotational positions is used to calculate the rotationally varying (RV) components of the surface errors. The difference between the data at the first and second lateral positions is used to calculate the rotationally invariant (RI) terms of the surface errors. The calibrated angle measurement system measures the mechanical tilt during shearing. The tilt data is used to correct the sheared data, preferably before computation of the rotationally invariant (RI) terms. Alternatively, the data can be used to compute the spurious quadratic term and correct after integration.

BRIEF DESCRIPTION OF THE DRAWINGS

The structure, operation, and methodology of the invention, together with other objects and advantages thereof, may best be understood by reading the detailed description in connection with the drawings in which each part has an assigned numeral that identifies it wherever it appears in the various drawings and wherein:

FIG. 3, represents, schematically, the overlap of two sheared flats measured by the invention, and FIGS. 4a and 4b are diagrammatic plan views of another embodiment of the invention shown with parts differently positioned.

DETAILED DESCRIPTION

The present invention relates to methods and apparatus by which tilt induced between flats during lateral shearing can be compensated for prior to calculating rotationally invariant (RI) terms.

The tilt corrected lateral plus rotational shear procedure for absolute testing of flats (including the quadratic term) requires the following steps:

1. Determine (e.g., from an analysis of target uncertainty in the measurement) if it will be necessary to correct data for the distortion in the interferometer optical system. If yes, determine if nominal (design) or measured distortion data is required. Distortion can be corrected, for example, by generating and storing distortion maps of known targets as seen by the system detector and then using the distortion data to correct the measured data.

2. Compute the sensitivity of the specific test, in terms of the spurious quadratic term, to tilt errors in lateral mechanical shearing.

3. Calibrate a high sensitivity angle measuring system using the main interferometer and the interferometric cavity between the reference surface or wavefront and the surface under test.

4. Calculate maps of the rotationally varying (RV) components of the reference surface and the surface under test using data obtained by rotational shearing and processed using averaging, Fourier analysis, or any other method known in the art. Correct for distortion if necessary.

5. At one of the positions at which data for step 3 was taken, laterally shear the surface under test.

6. Record the change in tilt during the lateral shearing process using the independent angle sensing system.

7. Subtract the RV components from the initial and sheared data set, ensuring that the data are subtracted in the proper coordinate system (distortion corrected if necessary).

8. Difference the initial and sheared data sets, correcting the difference data based upon the measured tilt change of the test part mount between the two measurements and, in the overlap region, compute the mean radial profile (including the quadratic (power) term) for the reference surface and the surface under test. (A mathematically efficient method for doing this is disclosed in U.S. patent application Ser. No. 11/052,608 filed on Feb. 7, 2005, published on Aug. 11, 2005 as U.S. Patent Publication No. 2005-0177339 A1, in the name of William P. Kuhn and bearing the title PRECISION SURFACE MEASUREMENT)

9. Synthesize maps of the RI terms for reference surface and the surface under test from the mean radial profile.

10. Add the computed RV and RI terms to obtain separate maps of the reference surface and the surface under test.

Figure 1:
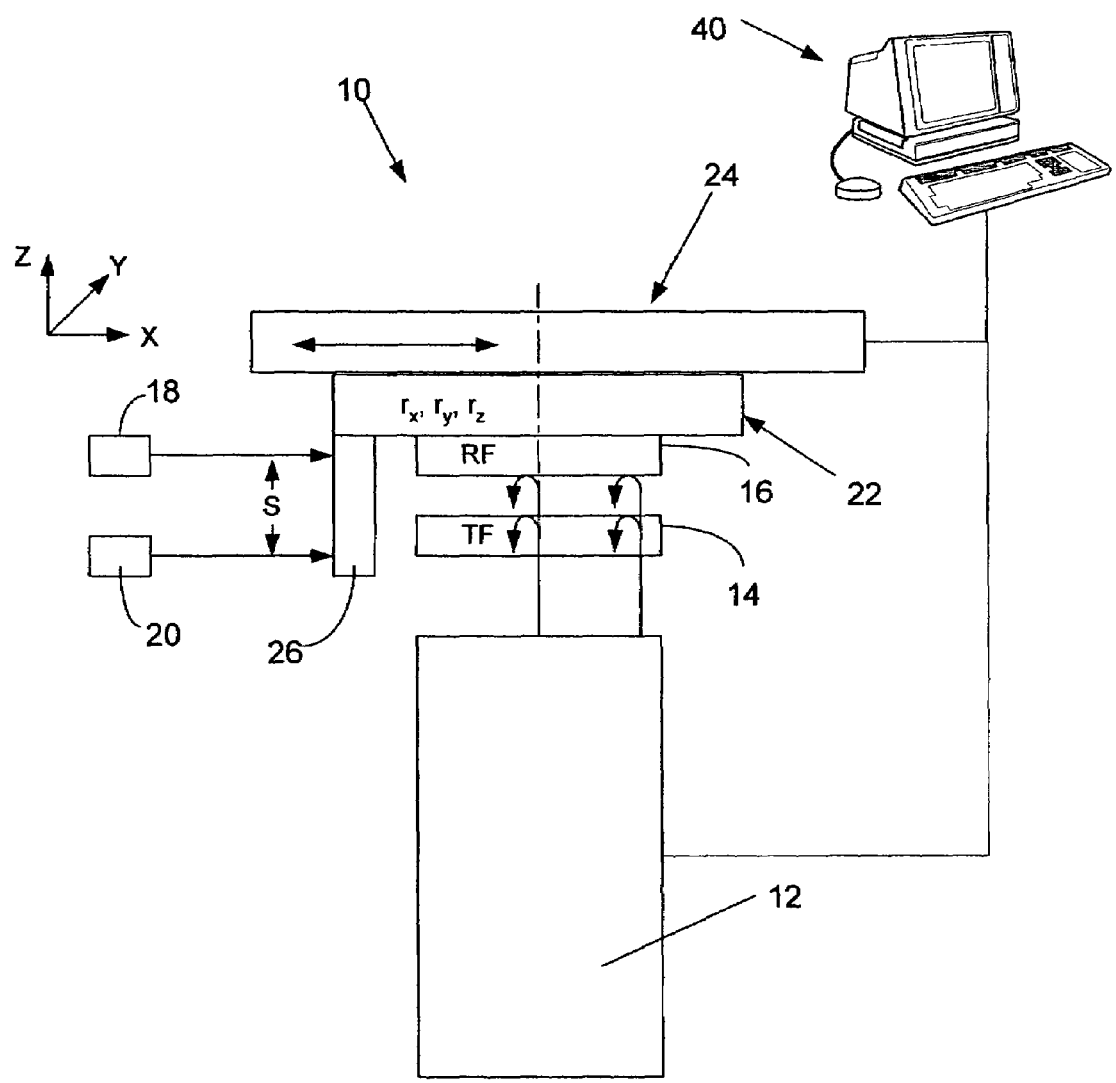
FIG. 1 is a diagrammatic plan view of an embodiment of apparatus of the invention.

A preferred embodiment of a system 10 by which the above-described process can be practiced is shown schematically in FIG. 1. As seen there, system 10 comprises a preferably Fizeau interferometer 12 including a transmission flat (TF) 14 and a return flat (RF) 16, or part under test. High stability plane mirror interferometers 18 and 20 in conjunction with a return mirror 26 are separated by a distance, s, for use in differentially measuring tilt over a shear distance. A rotary table 22 sits atop a linear slide 24 and operates to provide rotational shear ($R_z$), and has associated with it tip and tilt motions $r_x$ and $r_y$. The linear slide 24 is used to translate the rotary stage 22 and return flat 16 as needed. A computer 40 is included for providing precise control of the movements of the various stages, collecting and reducing data, and performing housekeeping and user interface functions. As is well-known, computer 40 is provided with suitable software to implement the various algorithms of the invention. Those versed in the art will appreciate that the invention may be practiced with other main interferometer configurations (e.g., Twyman-Green), other angle sensors (e.g., autocollimator, optical lever, another Fizeau interferometer, displacement measuring interferometers with corner cubes, etc.)

Figure 2:
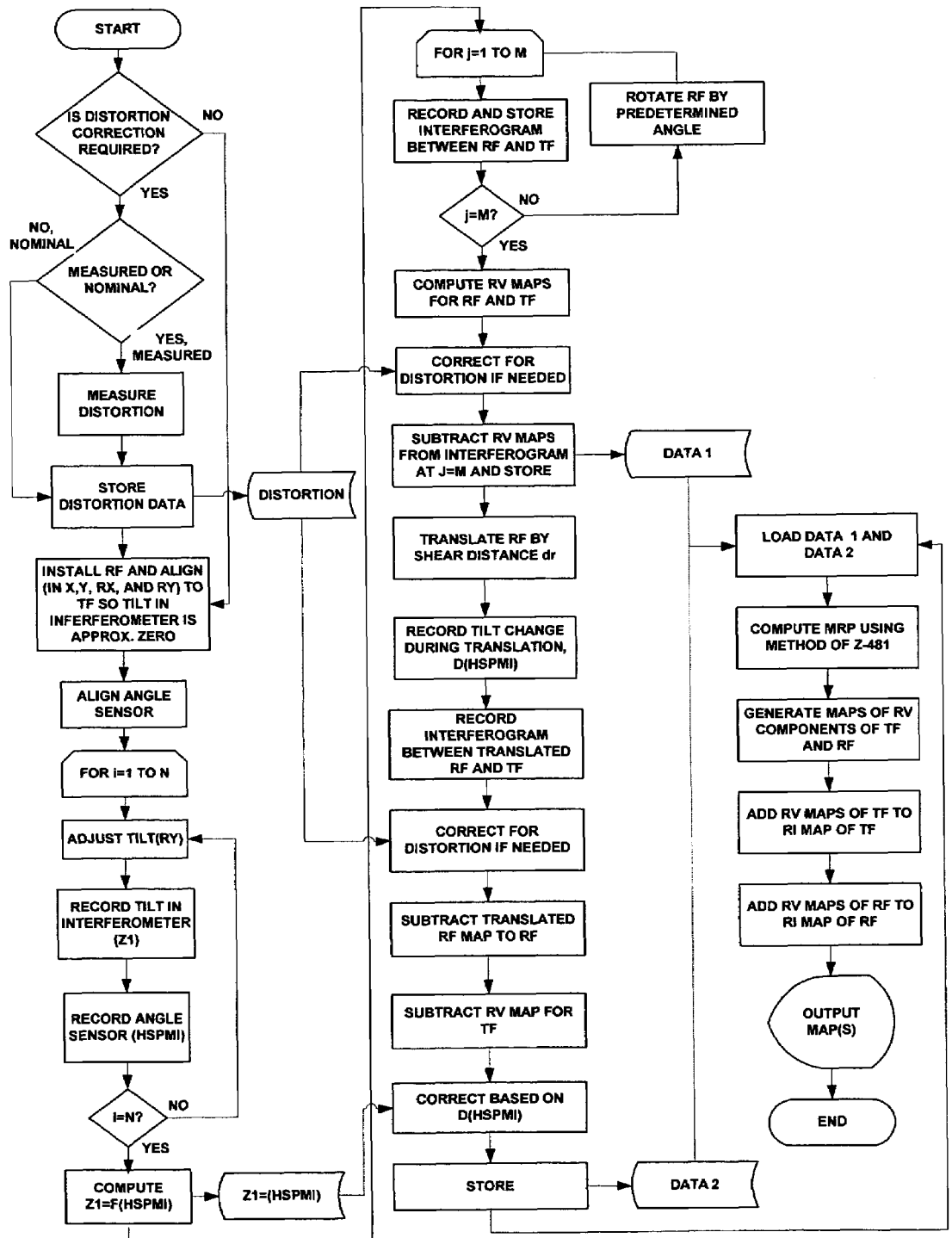
FIG. 2 is a flow chart showing the steps taken in the measurement process using the embodiment of the apparatus of FIG. 1 to illustrate one possible implementation of the present invention.

FIG. 2 is a flowchart showing the steps taken in the measurement process using the preferred system 10 to illustrate one possible implementation of the present invention. It will be immediately apparent that variations in the process are possible that follow the spirit of this invention. For example, the number of angle positions M and their angular orientation to each other depends on the method chosen to calculate the RV components.

1. Sensitivity To Tilt

The sensitivity to tilt depends on the aperture of the parts under test and the distance over which the lateral shear takes place. This can be easily understood considering FIG. 3 that represents, schematically, the overlap of the two flats. In the initial position (left of FIG. 3), the two optical path differences along the marked radius (after subtraction of RV components) is:

$$M_1(r) = RF(r) + TF(r) \tag{1}$$

Where, for simplicity, r is the normalized radius, ($r=0 \to 1$). After shearing a distance dr $$M_2(r) = RF(r+dr) + TF(r) \tag{2}$$

Clearly the difference $$M_2(r) - M_1(r) = RF(r+dr) - RF(r) \tag{3}$$

is the derivative of mean radial profile of RF averaged over the shear distance dr. Hence, we can integrate the difference of the two measurements in the shear direction to obtain the mean radial profile of RF—from which the mean radial profile of TF follows from Eq. (1).

If there is a change in the relative tilt between the first and second measurement with a magnitude A at r=1 then this tilt will be present in the difference between the two sheared measurements and the result is that the difference signal is now $$\Delta M = M_2(r) - M_1(r) = RF(r+dr) - RF(r) + Ar.$$

A(r) is an error term. To calculate the value of RF(r) it is necessary to integrate the difference data. Considering only the tilt change A(r), the error due to tilt drift is $$E(r) = \int Ar\, dr = Ar^2/2.$$

It is possible to use this relation to set a tolerance on the allowable tilt between measurements required to ensure that the measurement uncertainty is within specified limits.

Methods for calculating the mean radial profile using the full two-dimensional data set, rather than just a profile are disclosed in commonly owned U.S. patent application Ser. No. 11/052,608 filed on Feb. 7, 2005 in the name of William P. Kuhn and bearing the title PRECISION SURFACE MEASUREMENT, published on Aug. 11, 2005 as U.S. Patent Publication No. 2005-0177339 A1, the entire contents of which are incorporated herein by reference.

The invention described in U.S. Patent Publication No. 2005-0177339 A1 is a computationally efficient method to determine the mean radial profile of a test part with sub-pixel resolution, unbiased by the errors in a reference surface, given the rotationally varying part of the test and reference surface and two measurements that are laterally displaced (sheared) a known amount.

As explained there in more detail, it is possible to write a system of linear equations that relate the mean radial profile of the test or reference surface in terms of the measured data and separately determined rotationally varying component of the test and reference surface. A novel part of the solution is to write equations in terms of the radial coordinate, not the horizontal and vertical pixel coordinates, dramatically reducing the number of unknowns that must be solved. For a sense of scale, given a 2000 by 2000 pixel detector (1000 pixel radius) the matrix would be about 3,140,000 rows by 3,140,000, if written in terms of rows and columns, but the dimensions are 3,140,000 rows by 1,000 columns if written in terms of the pixel radius.

The matrix written in terms of the radial coordinate is still too large to process in all but the largest computers. However, if use is made of the normal equations and simultaneously performing matrix multiplications using outer-products rather than inner-products as is usually done, the matrix that must be solved is 1,000 rows by 1,000 columns, and the peak memory usage is related to the small resultant matrix, not the large matrix and the problem easily fits in memory of commonly available computers.

Another novel aspect is that each row of the large matrix, which is used to calculate the small matrix, is sparse in a way that makes it very easy and fast to compute the resultant matrix. Typically, there are only four or perhaps six non-zero elements in each row, and all of the multiplications and additions with zero elements can be skipped, which is the vast majority of operations.

One more novel aspect is the ability to write linear equations in terms of the rotationally invariant part, sampled more finely than the pixel spacing. Sub-pixel resolution is possible because the surface is sampled at many combinations of horizontal and vertical pixel locations whose radial distance is not at an integer multiple of the pixel distance. If we look at the radial interval of 0 to 1 pixel, there are no samples in between. However, between a radial distance of 1 and 2, there are four samples at a radial distance of $\sqrt{2}$. As one moves further from the origin, the spacing of samples rapidly increases. As a result, it is possible to solve for the mean radial profile at a sub-pixel resolution with qualification that very near the origin, the density of sampling is somewhat limited.

The steps required by the method are as follows:

1. Obtain, through a process described earlier, an estimate of the rotationally varying part of both the test and reference surfaces.
2. Obtain a first measurement of the test part biased by the measurement instrument.
3. Laterally displace the test part relative to the measurement system by a known amount.
4. Obtain a second measurement of the test part biased by the measurement system.
5. Form a linear combination of the data from the first measurement, second measurement, rotationally varying component of the measurement system, rotationally varying component of the test part, and rotationally varying component of the test part translated an amount and direction equivalent to the lateral shear between measurements such that the resulting data contains only the difference between the rotationally invariant part of the test surface and a sheared copy of the rotationally invariant part of the test surface.
6. Form the data vector and matrix representation of the normal equations that relates the data vector to the difference between the mean radial profile of the test part and a sheared copy of the mean radial profile.
7. Add one equation to the equation to define an average value of zero so that the matrix is not singular.
8. Solve the matrix equation using standard techniques.

From the foregoing description, it should be clear that the spurious quadratic term depends on the tilt change of the RF during the mechanical translation (shear) and the shear distance. It should also be clear that computation of the sensitivity to tilt during translation can conveniently be performed using coordinates normalized to the unit circle (or in terms of the lowest order Zernike polynomials). This approach, while not mandatory, eliminates the need to know part diameters exactly in order to perform accurate tilt calibration.

The preferred embodiment uses the two high stability plane mirror interferometers 18 and 20 separated by distance s to measure tilt. The RF and the return mirror 26 for the HSPMI in FIG. 1 is mounted on the same tip tilt stage 22. By tilting about the y-axis, we can measure the change in tilt recorded by the (Fizeau) interferometer 12 as a function of the difference in the HSPMI readings, Z1=f(HSPMI).

1. The (Fizeau) interferometer 12 is used measure the tilt between the test and reference surfaces 14 and 16, respectively.
2. The tip tilt stage 22 is used to induce a tilt between the test (RF) and reference (TF) surfaces preferably without translation of the RF.
3. Simultaneously measure the tilt induced between the test and reference surfaces using a conveniently large aperture and tilt in the test part mount using the external tilt measurement device. Only the component of tilt for the two measurements that is parallel is of interest. The external tilt measurement device needs to be reasonably well aligned to the shear motion.
4. Repeat for a range of induced tilts.
5. Fit the tilt data and determine the constant of proportionality between the external tilt measurement device and the interferometer. This allows for a determination of the separation distance for a pair of HSPMI.

Aperture Shape

It will be clear from the foregoing that the RV component map may only be calculated over a circular aperture that is common to both the RF and TF in the unsheared position. In some applications in may be advantageous to integrate the calibration apparatus with a mechanism that presents a part (of arbitrary shape smaller than the TF) for measurement with respect to the TF after the calibration process has separated TF and RF errors. One possible embodiment of such a system is shown schematically in FIGS. 4a and 4b. As seen there, a slightly modified version of system 10 is designated as system 10' in which parts in common with system 10 have retained their original numeral designations as they appear in FIG. 1 and computer 40 has been deleted for simplicity. System 10' differs from system 10 by having a translation stage 24' that is longer than its counterpart 24 of FIG. 1. In addition, translation stage 24' has mounted on it a part mount 30 that carries a part 30 to be tested. After the calibration process as pictured in FIG. 4a, the part 32 may be tested by simply translating stage 24' with respect to interferometer 12 to the position illustrated in FIG. 4b.

Other variants of the invention will be apparent to those skilled in the art based on its teachings. For example, angle measuring may be made using an autocollimator, optical lever or other sensitive angle sensor. Such variants are intended to be within its protected scope.

What is claimed is:

1. A method for profiling optical flats, said method comprising the steps of:
    mounting a test flat having rotationally invariant (RI) and variant (RV) terms in an first interferometer having a transmission flat (TF) so that the test flat can be precisely tilted, rotated and translated;
    adjusting the tilt between the test flat and the first interferometer transmission flat of the first interferometer to be nominally zero;
    in-situ calibrating an external angle measurement system developing a functional relationship, (Z1=f(High Stability Plane Mirror Interferometer, HSPMI)) between a tilt measured by the first interferometer and an externally induced mechanical tilt;
    introducing a shear between the test flat and the first interferometer transmission flat and measuring the mechanical tilt during shearing between the test flat and first interferometers transmission flat to generate sheared data; and
    using the function (Z1=f(HSPMI), correcting the sheared data and then computing the rotationally invariant (RI) terms of the test flat.

2. A method of profiling optical flats according to claim 1 where a test flat is introduced into an interferometer selected from the group consisting of Fizeau and Twyman-Green interferometers.

3. A method for profiling optical flats, said method comprising the steps of:
    mounting a test flat having rotationally variant (RV) and invariant (RI) terms in a Fizeau interferometer having a transmission flat (TF) so that the test flat can be precisely tilted, rotated and translated;
    adjusting the tilt between the test flat and the interferometer transmission flat of the Fizeau interferometer to be nominally zero;
    in situ calibrating a high sensitivity angle measuring system using an independent interferometer and the Fizeau interferometric cavity formed between the reference surface of the interferometer transmission flat and the surface of the test flat being measured;
    rotationally shearing the test flat between different positions with respect to the interferometer transmission flat and calculating maps of the rotationally varying (RV) components of the reference surface of the interferometer transmission flat and the surface of the test flat under test using data obtained during rotational shearing and processed using steps selected from the group consisting of averaging and Fourier analysis;
    correcting for distortion, if necessary;
    at one of the positions at which data was taken to generate the maps of the RV components, laterally shearing the surface under test from an initial to a sheared position to generate a sheared data set;
    recording the change in tilt during the lateral shearing process using the high sensivity angle sensing system;
    subtracting the RV components from the initial and sheared data set, ensuring that the data are subtracted in the proper coordinate system and distortion corrected if necessary;
    differencing the initial and sheared data sets to form difference data, correcting the difference data based upon the measured tilt change of the test part mount between the two measurements and, in an overlap region between the original and sheared positions, computing the mean radial profile, including the quadratic power term for the reference surface of the interferometer transmission flat and the surface of the test flat under test;
    synthesizing maps of the rotationally invariant (RI) terms of the reference surface of the interferometer transmission flat and the surface of the test flat under test from the mean radial profile; and
    adding the computed RV and RI terms to obtain separate maps of the reference surface of the interferometer transmission flat and the surface of the test flat under test.

4. A method for profiling optical flats, said method comprising the steps of:
    mounting a test flat having rotationally invariant (RI) and variant (RV) terms in a Fizeau interferometer having a transmission flat (TF) so that the test flat can be precisely tilted, rotated and translated;
    adjusting the tilt between the test flat and the interferometer transmission flat of the Fizeau interferometer to be nominally zero;
    mechanically adjusting the tilt of the test flat and measuring the corresponding tilt in the Fizeau interferometer while monitoring the amount of mechanical tilt with a separate tilt measuring interferometer to develop a functional relationship, (Z1=f(High Stability Plane Mirror Interferometer, HSPMI)), between the tilt measured by the Fizeau interferometer and the mechanically adjusted tilt;
    selectively rotating the test flat a predetermined number of times and recording and storing corresponding interferograms from the Fizeau interferometer;
    computing RV maps for the rotationally variant components (RV) of the test flat and Fizeau interferometer transmission flat;
    subtracting the RV maps from the corresponding interferograms and storing the results;
    translating the test flat by a shear distance, dr;
    recording the mechanical tilt, with the separate tilt measuring interferometer, caused by the translation by the shear distance, dr;
    recording the interferogram between the translated test flat and the Fizeau interferometer transmission flat;
    subtracting the translated RV map for the test and Fizeau interferometer transmission flats;
    correcting the results for tilt based on the function, Z1=f(HSPMI) and the measured tilt caused by the translating by the shear distance, dr;
    computing the mean radial profile (MRP); and determining the final profile of the test flat taking into account the rotationally variant RV and rotationally invariant RI components of the test flat and Fizeau interferometer transmission flat.

5. The method of claim 4 where the interferometer transmission flat TF is rotated to compute the RV terms.

6. The method of claim 4 where the interferometer transmission flat TF is translated to allow computation of the RI terms.

7. The method of claim 4 where the interferometer transmission flat TF is both translated and rotated.

8. The method of claim 4 comprising the further steps of determining the distortion in the Fizeau interferometer prior to taking any measurements with it and correcting subsequently obtained RV maps for the test flat and Fizeau interferometer transmission flat prior to introducing any shear between the two.

* * * * *